T. JURIW.
BEEHIVE.
APPLICATION FILED JUNE 12, 1920.

1,374,745.

Patented Apr. 12, 1921.
2 SHEETS—SHEET 1.

INVENTOR
T. Juriw

ATTORNEY

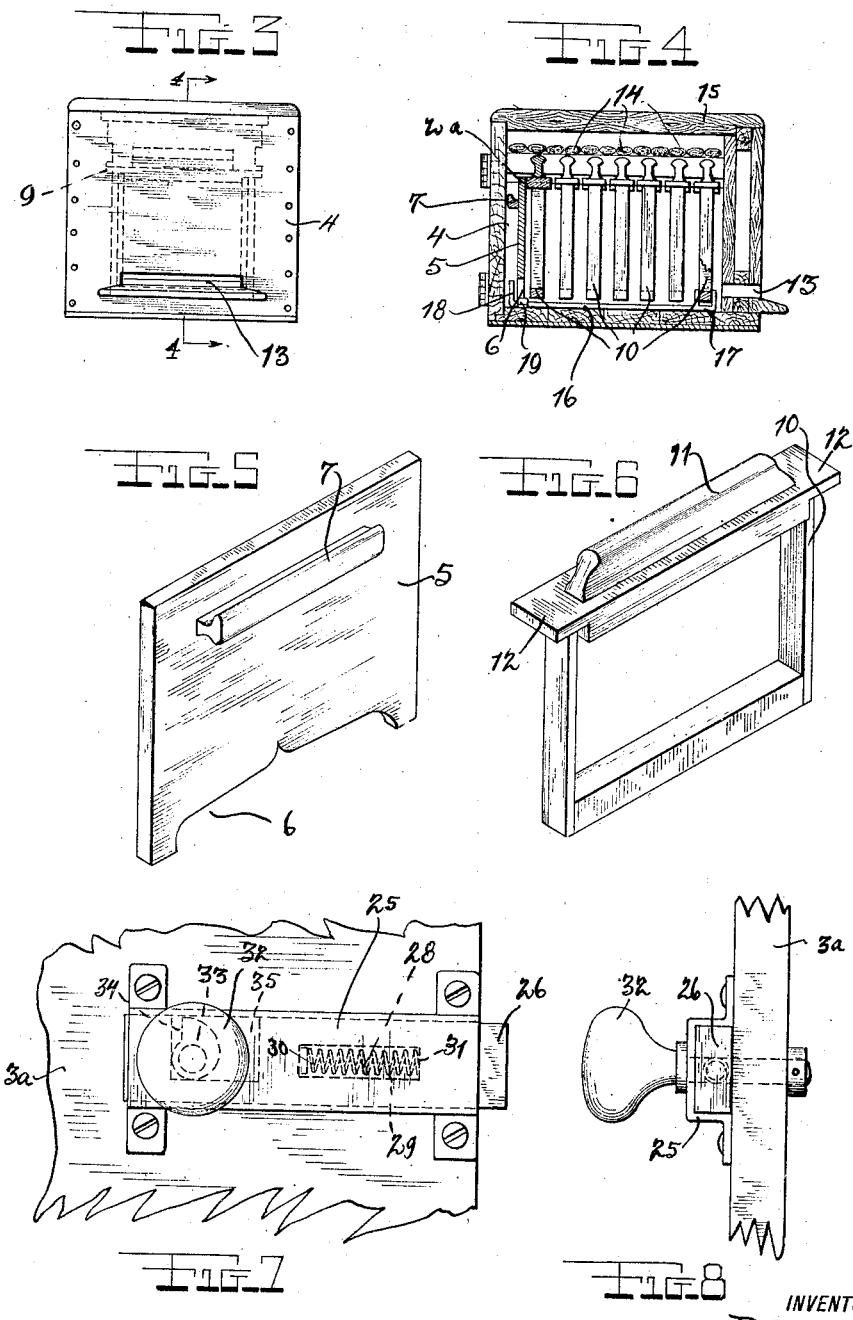

UNITED STATES PATENT OFFICE.

TEODOR JURIW, OF EAST DOUGLAS, MASSACHUSETTS.

BEEHIVE.

1,374,745.   Specification of Letters Patent.   Patented Apr. 12, 1921.

Application filed June 12, 1920. Serial No. 388,398.

*To all whom it may concern:*

Be it known that I, TEODOR JURIW, citizen of Poland, and resident of East Douglas, in the county of Sullivan and State of Massachusetts, have invented certain new and useful Improvements in Beehives, of which the following is a specification.

This invention relates to bee hives, and has for its main object the provision of such a device by means of which the production of honey may be carried on in an efficient and sanitary manner.

Another object of the invention is the provision of a hive having means for ready access to and exposure of the interior for the purpose of removing the honey therefrom and also of cleaning the same.

The above and other objects will become apparent in the description below, in which characters of reference refer to like-named parts in the drawings.

Referring briefly to the drawings, Figure 1 is a side elevational view of my device, with the shed thereof shown in its two extreme positions.

Fig. 3 is a rear view of one of the compartment inclosures.

Fig. 4 is a cross-sectional view on the line 4—4 of Fig. 3.

Fig. 5 is a perspective view of the end member of the comb rack located inside said compartment, Fig. 4.

Fig. 6 is a perspective view of one of the comb frames.

Fig. 7 is an enlarged front view of the latch used with my device to prevent accidental opening of the doors.

Fig. 8 is a side view of said latch.

Figure 1:
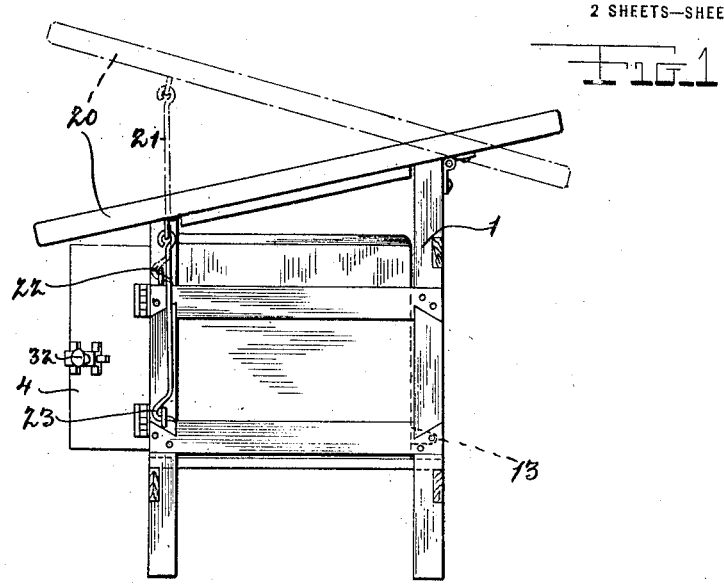

Referring now in detail to the drawings, the numeral 1 represents the open frame in which compartments or boxes 2 and 3 are removably placed, resting upon the panel 1ª. At their forward ends these compartments are equipped with doors 3ª and 4, respectively. Both compartments are alike; therefore but one will be described in detail.

Inside each compartment is, first, a front panel 5 having a recess 6 cut out of its lower edge, said panel also having a handle portion 7. The panel stands in vertical position in the compartment, and is readily removable; it is retained in vertical position solely by the pressure of the side walls of the compartment upon the sides of said panel 5.

As seen best in Fig. 4, behind the panel 5 are arranged a series of comb frames 10. The latter are constructed as seen in Fig. 6, having sidewise-projecting eaves 12 which engage in slots 9 on the interior walls 8 of the compartment. Each frame 10 is also provided with a handle 11 for moving the same. It is in these frames 10 that the bees deposit their combs.

In the rear of the compartment there is an opening 13 through which the bees enter and leave the same. Above the rack of comb frames lies a cover of straw 14 which tends to keep the interior of the compartment warm. The cover of the compartment is indicated at 15, and is removable for ready access to the interior. A rod 16 lies at the bottom of the compartment, and is provided with a small handle 18 at the forward end, and a fork 17 at the rear end, the latter adapted to engage the bottom of a frame 10 to assist in the removal of the latter along the slots 9. Said rod is pivotally held in a bracket 19 on the floor of the compartment.

A shed 20 is hingedly mounted upon the frame 1 above the said compartments, and the same may be lifted and supported in a raised position, indicated in Fig. 1, by means of a hooked rod 21, which may be engaged in either of the eyelets 22 or 23. The shed is normally in the lower position, but for access to the interior of the compartment it is preferably raised.

Figure 2:
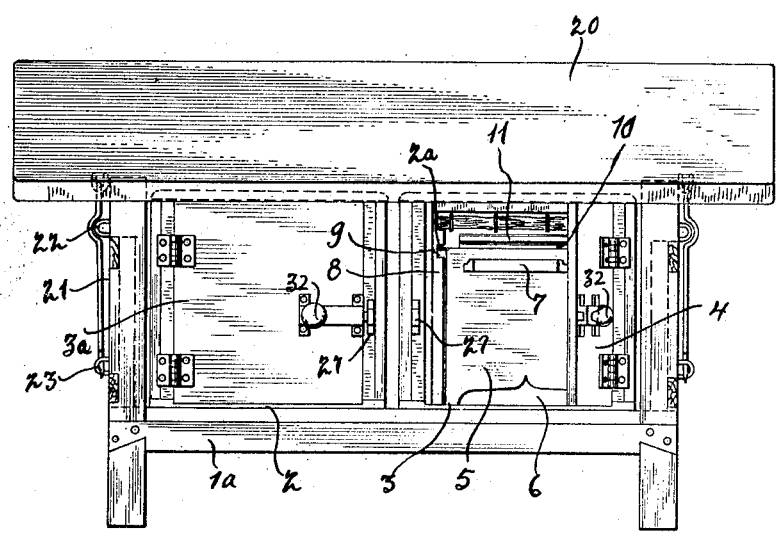
Fig. 2 is a front elevational view of the same.

In Fig. 7 is seen my latch, which comprises a frame 25 having a bolt 26 slidable therein to engage the catch 27 (Fig. 2). A slot 28 is provided in said bolt in which a spring 29 lies, secured at the end 31 to the bolt and at the end 30 to a projection of the door. Thus the spring urges the bolt into its "lock" position. A handle 32 is pivotally supported in the frame 25, and projects into a recess 35 in said bolt. A cam 33 is formed on the end of said handle, within said recess, and said cam is adapted to engage the shoulder 34 in order to slide the bolt to the left, or, to open the latch.

Thus it is apparent that I have provided a bee hive from which the combs may be readily and quickly removed, and which is sanitary and efficient in the production of honey. The entire device may be placed at any convenient place in the open air or in an inclosed chamber, and all the parts thereof may be removed in a simple manner for cleaning as well as for the collection of the honey comb.

Having thus described my invention, what I claim and desire to secure by Letters Patent is as follows:

In a device of the class described, boxes having compartments therein, each of said compartments having horizontal slots in opposite side walls thereof near the top of the compartment, rectangular comb frames adapted to be secured within said compartments, said frames having rigid eaves extending from opposite sides thereof, said eaves being adapted to slidably engage said slots, a door hinged to the front of said box, an opening in the rear of said box near the base thereof for the passage of bees, handles on the tops of said frames, a vertically situated cover at the front of said compartment having an opening in the bottom thereof and a handle rigid upon the outer surface thereof, a rod pivotally and slidably mounted on the floor of said compartment, a handle on the forward end of said rod, a fork on the rear end of said rod adapted to grasp the lower edge of said frames, and means for locking said doors.

Signed at E. Douglas, in the county of Sullivan and State of Massachusetts, this 5th day of June, A. D. 1920.

TEODOR JURIW.